(12) United States Patent
Igarashi et al.

(10) Patent No.: US 6,970,707 B2
(45) Date of Patent: Nov. 29, 2005

(54) HANDOVER CONTROL METHOD AND HANDOVER PATH DETERMINATION FOR USE IN COMMUNICATION SYSTEM

(75) Inventors: Ken Igarashi, Yokohama (JP); Masami Yabusaki, Kashiwa (JP); Yasuhisa Hayashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 569 days.

(21) Appl. No.: 10/103,711

(22) Filed: Mar. 25, 2002

(65) Prior Publication Data

US 2002/0137515 A1 Sep. 26, 2002

(30) Foreign Application Priority Data

Mar. 26, 2001 (JP) ..................................... 2001-088532

(51) Int. Cl.[7] .................................................. H04Q 7/20
(52) U.S. Cl. ..................... 455/437; 455/440; 455/441; 455/443
(58) Field of Search ................................ 455/436, 437, 455/438, 439, 440, 441, 443; 370/331, 328

(56) References Cited

U.S. PATENT DOCUMENTS

| | | | | |
|---|---|---|---|---|
| 4,670,899 A | * | 6/1987 | Brody et al. ................. | 455/453 |
| 5,794,149 A | * | 8/1998 | Hoo ............................ | 455/438 |
| 5,805,993 A | * | 9/1998 | Cherpantier et al. ..... | 455/422.1 |
| 6,052,598 A | | 4/2000 | Rudrapatna et al. | |
| 6,141,554 A | | 10/2000 | Choi | |
| 6,208,863 B1 | * | 3/2001 | Salonaho ..................... | 455/444 |
| 6,295,452 B1 | * | 9/2001 | Choi ........................ | 455/436 |
| 6,370,127 B1 | * | 4/2002 | Daraiseh et al. ............ | 370/328 |
| 6,529,490 B1 | * | 3/2003 | Oh et al. .................... | 370/331 |
| 6,633,554 B1 | * | 10/2003 | Dalal ......................... | 370/331 |
| 6,650,899 B1 | * | 11/2003 | Stumpert ..................... | 455/436 |
| 6,654,359 B1 | * | 11/2003 | La Porta et al. ............ | 370/328 |
| 6,807,422 B1 | * | 10/2004 | Ekman ....................... | 455/439 |
| 2001/0018345 A1 | * | 8/2001 | Longoni et al. ............. | 455/436 |
| 2001/0036830 A1 | * | 11/2001 | Wu et al. .................... | 455/436 |
| 2001/0055969 A1 | * | 12/2001 | Bonta et al. ................. | 455/436 |
| 2002/0065079 A1 | * | 5/2002 | Ekman et al. ............... | 455/436 |
| 2002/0105927 A1 | * | 8/2002 | Holma et al. ................ | 370/331 |
| 2002/0126633 A1 | * | 9/2002 | Mizutani et al. ............ | 370/329 |
| 2004/0038682 A1 | * | 2/2004 | Persson et al. .............. | 455/436 |

FOREIGN PATENT DOCUMENTS

| | | |
|---|---|---|
| CN | 1219829 | 6/1999 |
| EP | 1 081 969 | 3/2001 |
| EP | 1 081 974 | 3/2001 |
| GB | 2 332 340 | 6/1999 |
| GB | 2 359 220 | 8/2001 |
| WO | WO 99/31918 | 6/1999 |
| WO | WO 01/74110 | 10/2001 |

* cited by examiner

*Primary Examiner*—W. R. Young
*Assistant Examiner*—Dai Phuong

(57) ABSTRACT

The handover control method for use in a mobile communication system changes a handover method according to an overlapping zone residence time of a mobile station by ranking three handover methods for the mobile station including a gateway handover method, a base station controller path extension handover method, and a radio link path extension handover method in association with how long the overlapping zone residence time of the mobile station is, and by selecting one handover method that corresponds to the overlapping zone residence time of the mobile station. When either the gateway handover method or the base station controller path extension handover method is selected for use, the handover method selects a handover path of which load on the system is minimum among the handover paths that can be employed by the selected handover method.

10 Claims, 9 Drawing Sheets

HANDOVER CONTROL METHOD AND HANDOVER PATH DETERMINATION FOR USE IN COMMUNICATION SYSTEM

BACKGROUND OF THE INVENTION

1. Field of the Invention

The present invention generally relates to a handover control method in a mobile communication system, more particularly to a handover control method and apparatus for varying a handover method according to an overlapping zone residence time of a handover-performing mobile station, and for varying a route of a handover path according to load on each node in a network.

2. Description of the Related Art

In a typical mobile communication system, an area within radio range of a radio base station is referred to as a cell, and there is a zone where the cells overlap each other, which is referred to as an overlapping zone hereinafter, as shown in FIG. 1. In FIG. 1, base station controllers are denoted by BSC, base transceiver stations are denoted by BTS, and a mobile station is denotes by MS. A handover process of the mobile station takes place when the mobile station comes into the overlapping zone.

Three methods for performing handover have mainly been proposed: (a) a gateway handover method as shown in FIG. 2, (b) a base station controller path extension handover method as shown in FIG. 3, and (c) a radio link path extension handover method as shown in FIG. 4.

In an existing mobile communication as typified by 3GPP (3rd Generation Partnership Project), it is common to fix a handover method for each network control method.

For example, in a circuit switching method in which a delay requirement is severe, (b) the base station controller path extension handover method may be employed, in which a path set up to the base station controller is extended, while in a packet exchange method in which a delay requirement is not so severe, (a) the gateway handover method may be employed, in which a path set up among relay nodes is reset up, in order to use network resources effectively.

Since the above-described conventional handover control method, however, fixes a handover method to each network control method, (1) the traffic is congested at a certain node when a certain network control method is intensively used in a certain area.

Particularly, in the conventional handover control method, since, upon a path being set up, paths via the same route are generally set up to the mobile stations using the same network control method in the same area, the above problem (1) is remarkable.

Also, since the above conventional handover control method determines the handover method to use according to the network control method, and does not take into account an overlapping zone residence time of the mobile station limiting a handover process time, (2) network resources are not used efficiently. This problem (2) is described in detail below.

The handover process must be completed while the mobile station stays in the overlapping zone. If the mobile station goes out from the overlapping zone without completing the handover process, packet losses or a line disconnection may occur because the mobile station has not established a connection with a handover-targeted base station.

As seen in FIG. 2, applying (a) the gateway handover method, both path routes before and after the handover process run through the same route to the gateway, and are adaptively routed in each optimal path route from the gateway to the mobile station, taking into account the load on each node. Also as seen in FIG. 3, applying (b) the base station controller path extension handover method, both paths before and after the handover process are routed in the same route to the base station controller, and are adaptively routed in each optimal path from the base station controller to the mobile station, taking into account the load on each node. Further as seen in FIG. 4, applying (c) the radio link path extension handover method, both paths before and after the handover process are routed in the same route to the previous base station before the handover process, and are adaptively routed in radio link paths via each optimal base station from the base station to the mobile station, taking into account the load on each base station.

Since the time required for the handover process is generally in proportion to the number of paths (i.e. hop count) to be reset up, comparing the handover process times among the above three methods, the handover process time in method (a) is longer than one in method (b), which is longer than one in method (c), in short, (a)>(b)>(c).

On the other hand, if a branch point where the path routes before and after the handover process go separate ways is located further downstream (closer to the mobile station) in the network, the paths fixed by the method increases and the flexibility of the path set-up decreases. In this case it becomes difficult to set up the optimal route for the network by taking into account the load on each node. Also, if the branch point is located further downstream in the network, a path route of a new connection may become devious, i.e. the path route may include redundant paths. In this case, because of such redundant paths, the efficiency of use of the network resources may decrease, and additionally the load on the network may increase. Therefore, as to the load on the network when the above three methods are employed, in general, the load with method (a) may be smaller than one with method (b), which may be smaller than one with method (c), in short, (a)<(b)<(c).

Thus, in selection of the handover method, the relationship between the handover process time and the efficiency of use of the network resources is a trade-off. Therefore, if it is intended to reduce the handover process time as a priority whenever the handover method is determined, it would not always be efficient from the point of view of use of the network resources.

SUMMARY OF THE INVENTION

The present invention aims at the above-described characteristics in the selection of the handover method, and is directed at avoiding the above-described traffic congestion on a certain node and at improving the efficiency of use of the network resources. For this purpose, the object of the present invention is to provide a handover control method and apparatus for changing the handover method to be used according to the overlapping zone residence time of the mobile station, and for changing the path route according to the load on each node in the network.

According to one aspect of the present invention, a handover control method for use in a mobile communication system comprising the step of changing a handover method according to an overlapping zone residence time of a mobile station is provided.

In this aspect, the handover method may be selected among a gateway handover method, a base station controller path extension handover method, and a radio link path extension handover method. In this case, when an overlapping zone residence time of a handover-performing mobile station is relatively long, the gateway handover method may be selected; when the residence time is very short, the radio link path extension handover method may be selected; and otherwise the base station controller path extension handover method may be selected.

The overlapping zone residence time may be estimated on the basis of a velocity of the mobile station and a configuration of cells. Alternatively, the overlapping zone residence time may be estimated on the basis of the history of electric field intensity of the handover-performing mobile station.

According to another aspect of the present invention, a mobile communication system carrying out the above method is provided.

According to a further aspect of the present invention, a handover control apparatus that is provided in a communication network and carries out the above method is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

The handover control method according to the present invention employs a method for changing the handover method to be used according to the overlapping zone residence time of the mobile station.

As described above, in the selection of the handover method, the relationship between the handover process time and the efficiency of use of the network resources is a trade-off. Therefore, if it is intended all the time to reduce the handover process time as a priority, the network resources would not be used efficiently.

On the other hand, as to the mobile station of which the overlapping zone residence time is short, the handover method must be determined putting priority on the handover process time in order to avoid line disconnection. As to the mobile station of which the overlapping zone residence time is relatively long, there is no need to complete the handover process within a time shorter than necessary, and therefore in this case it is possible to put priority on improving the efficiency of use of network resources.

Thus, the handover control method according to the present invention makes the handover method variable and dependent on the overlapping zone residence time of the mobile station.

Figure 1:
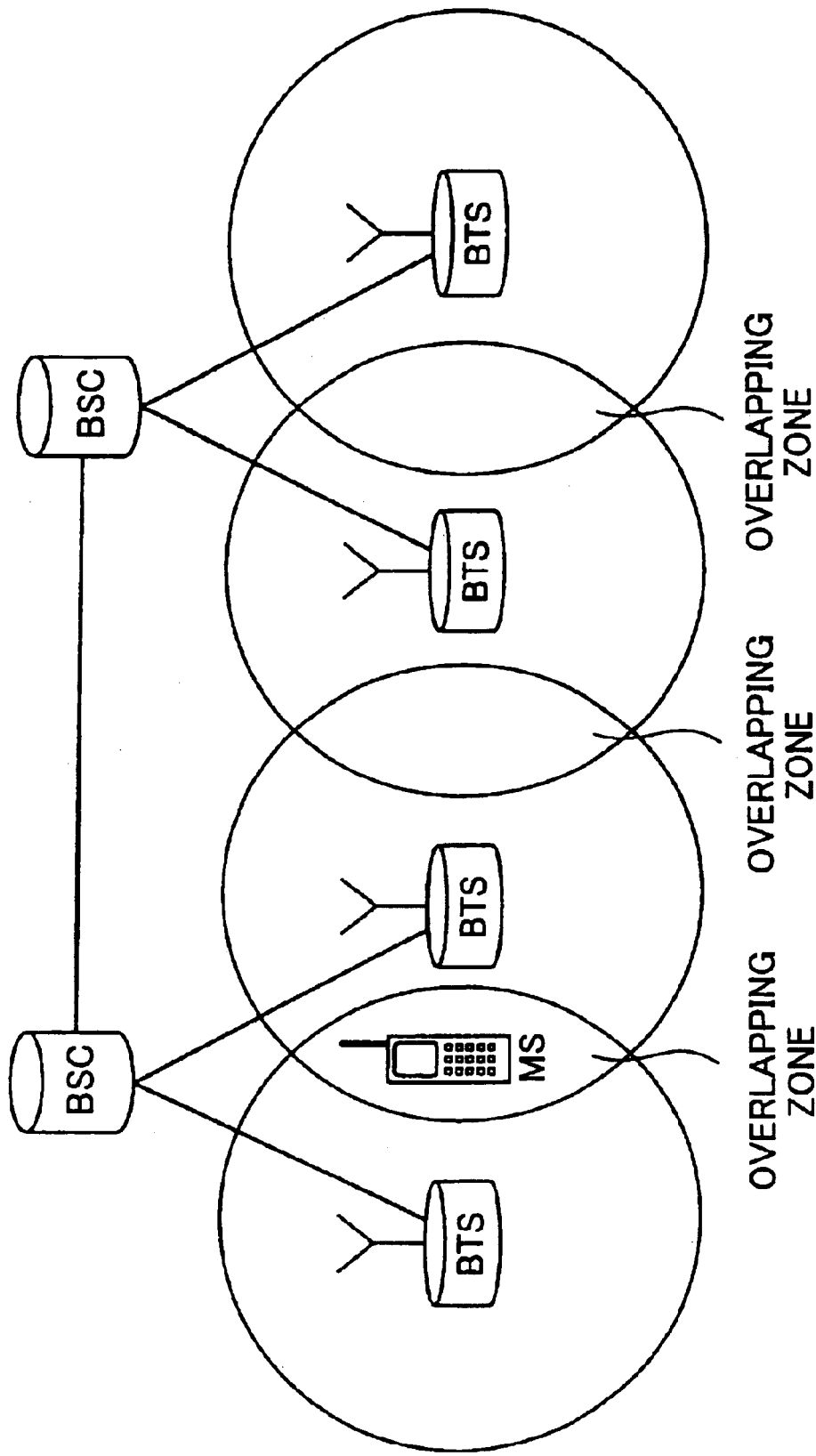
FIG. 1 is a schematic showing the conventional mobile communication system.
Figure 2:
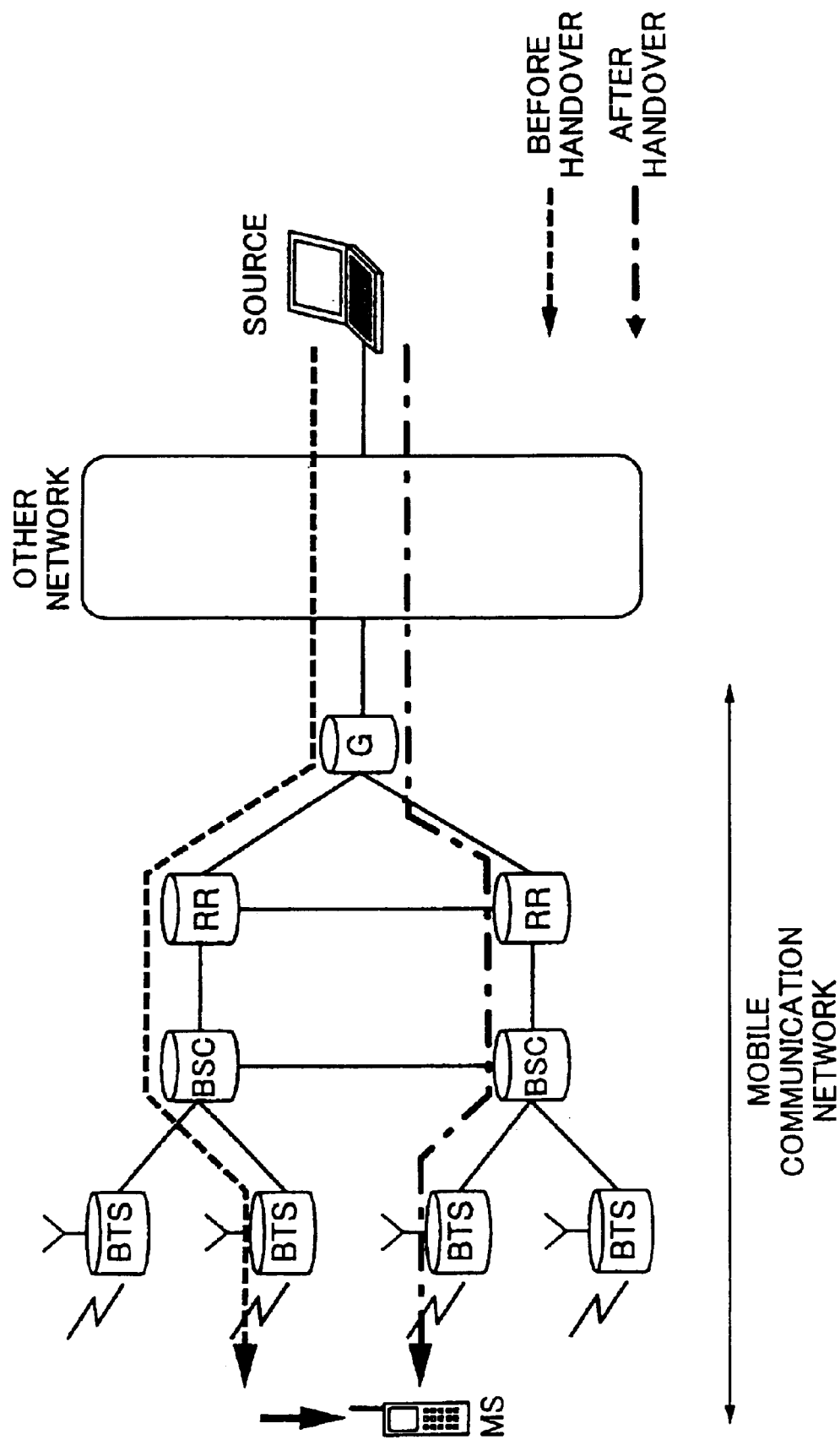
FIG. 2 is a schematic showing an aspect of setting up a handover path using the gateway handover method.
Figure 3:
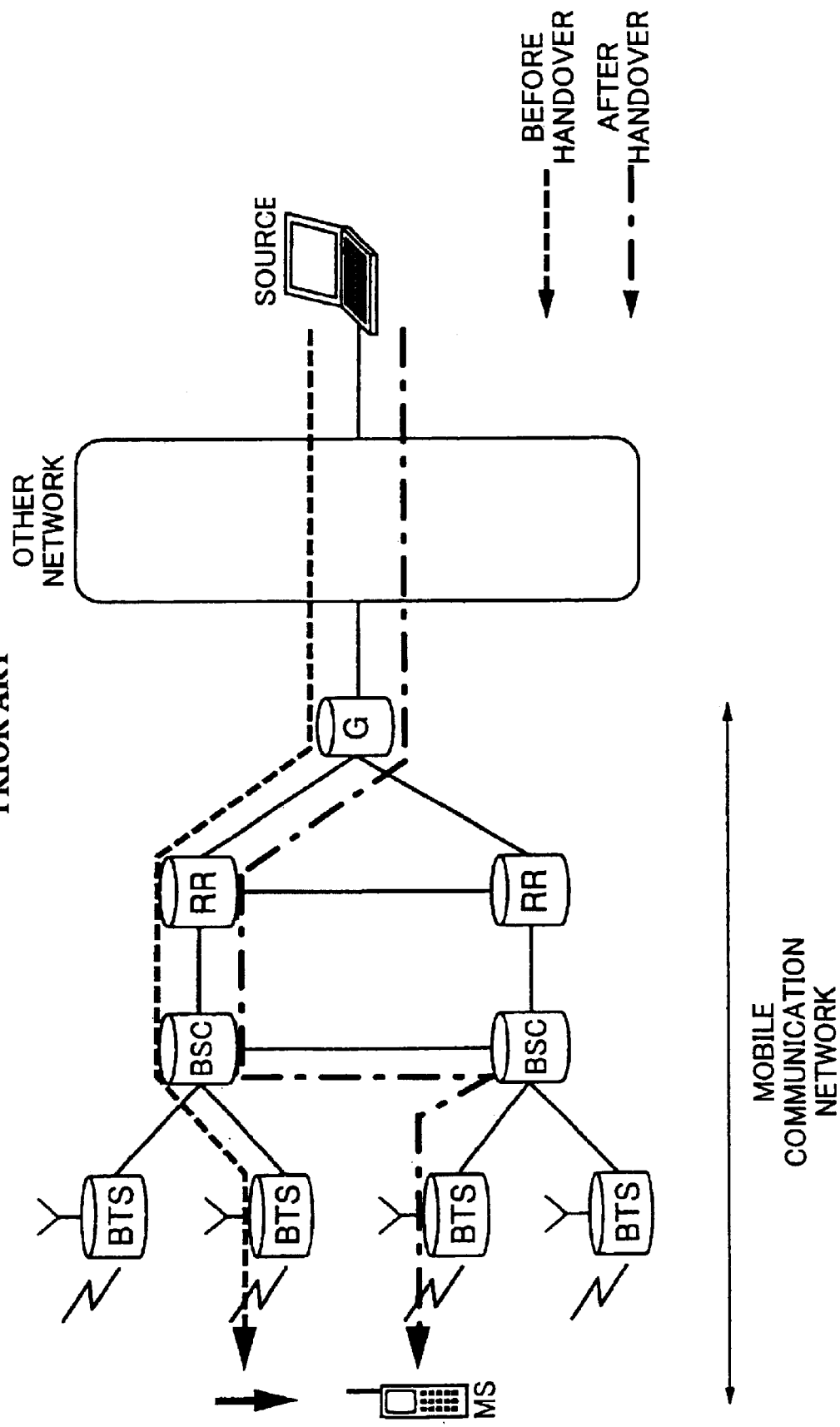
FIG. 3 is a schematic showing an aspect of setting up a handover path using the base station controller path extension handover method.
Figure 4:
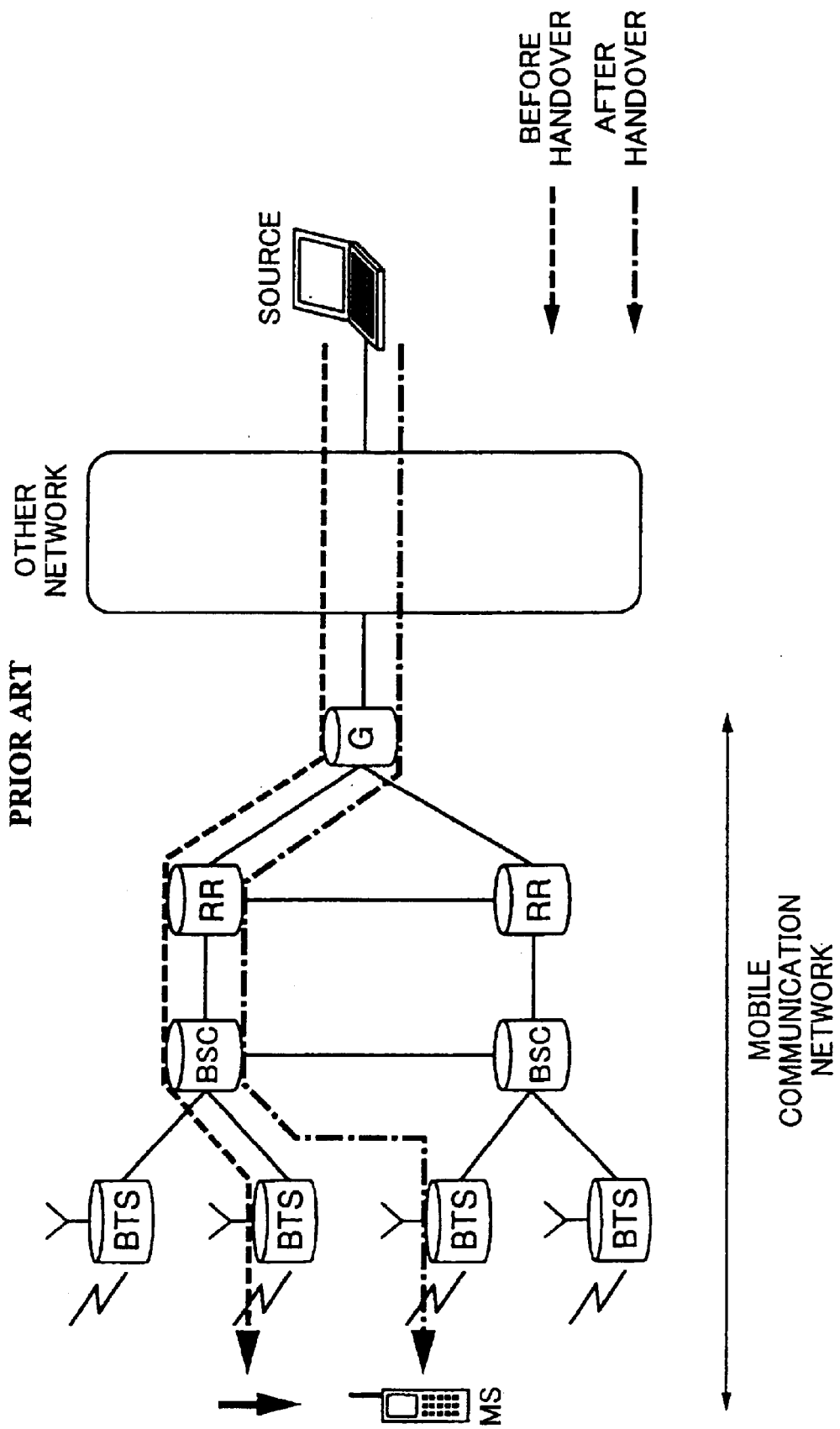
FIG. 4 is a schematic showing an aspect of setting up a handover path using the radio link path extension handover method.
Figure 5:
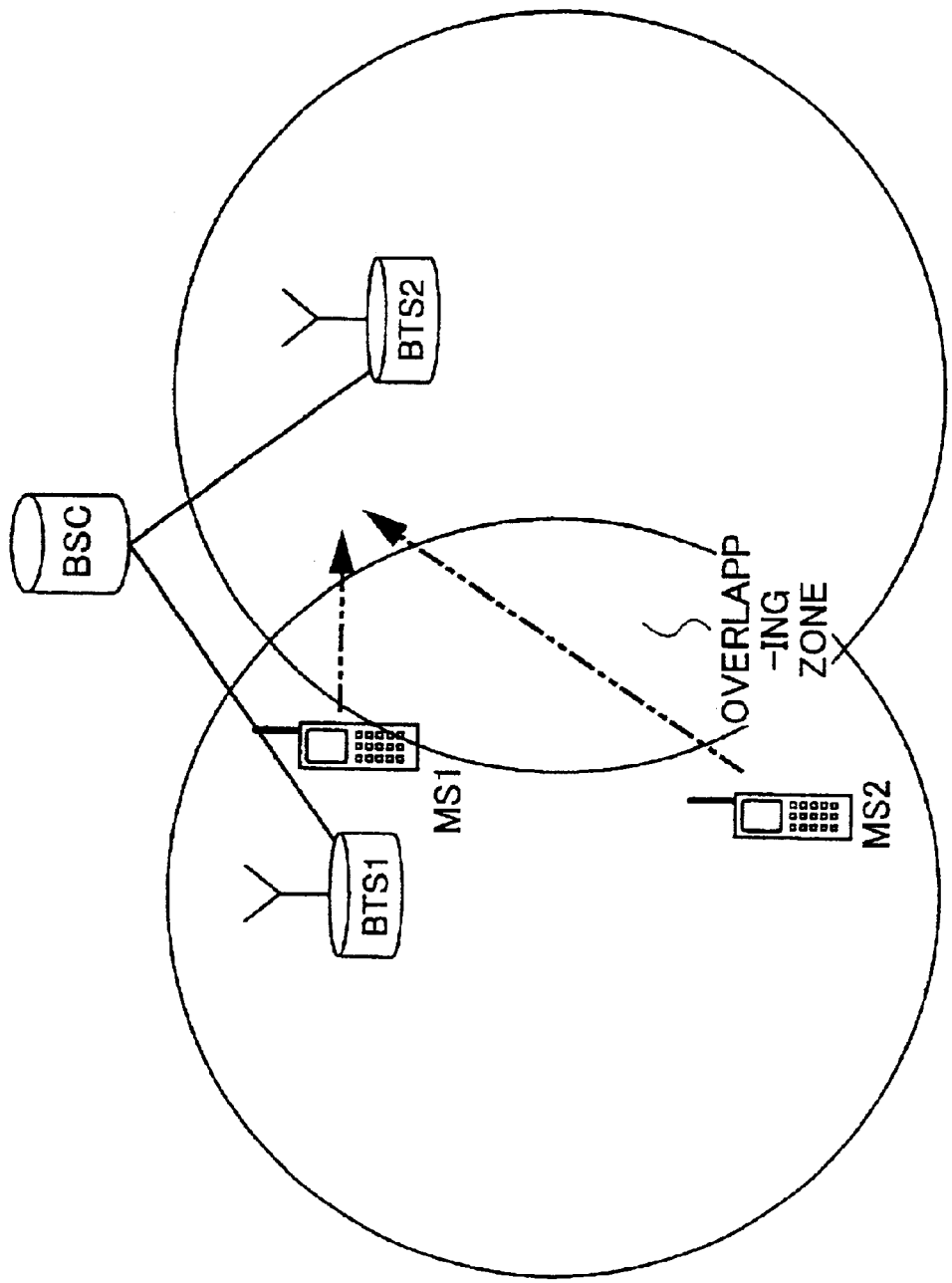
FIG. 5 is a schematic showing an aspect of a mobile station performing the handover process.

In this context, the "overlapping zone residence time" is not always in proportion to the movement speed (scalar quantity) of the mobile station. In an example shown in FIG. 5, in which both MS1 and MS2 are performing the handover process from a cell controlled by BTS1 to another cell controlled by BTS2 and are migrating along the respective arrows shown in the figure, if the speed (scalar quantity) of MS1 is the same as the speed of MS2, the overlapping zone residence time of MS2 is estimated to be longer than the overlapping zone residence time of MS1, while if the speed (scalar quantity) of MS1 is different from the speed of MS2, the overlapping zone residence time of MS1 could be longer than the overlapping zone residence time of MS2.

In other words, when the overlapping zone residence time is employed as a parameter, it could be incorrect to use the movement speed of the mobile station as a substitute parameter for the overlapping zone residence time. Therefore, the parameter should be set to an estimate that is an overlapping zone residence time estimated on the basis of the velocity (vector quantity having speed and direction) of the mobile station and of a configuration of the cells (especially shapes of the overlapping zones).

One embodiment according to the present invention is described below with reference to the accompanying figures. It should be noted that in the context of the below description, unless otherwise stated, a "speed" is a scalar quantity and a "velocity" is a vector quantity having a speed and a direction.

Figure 6:
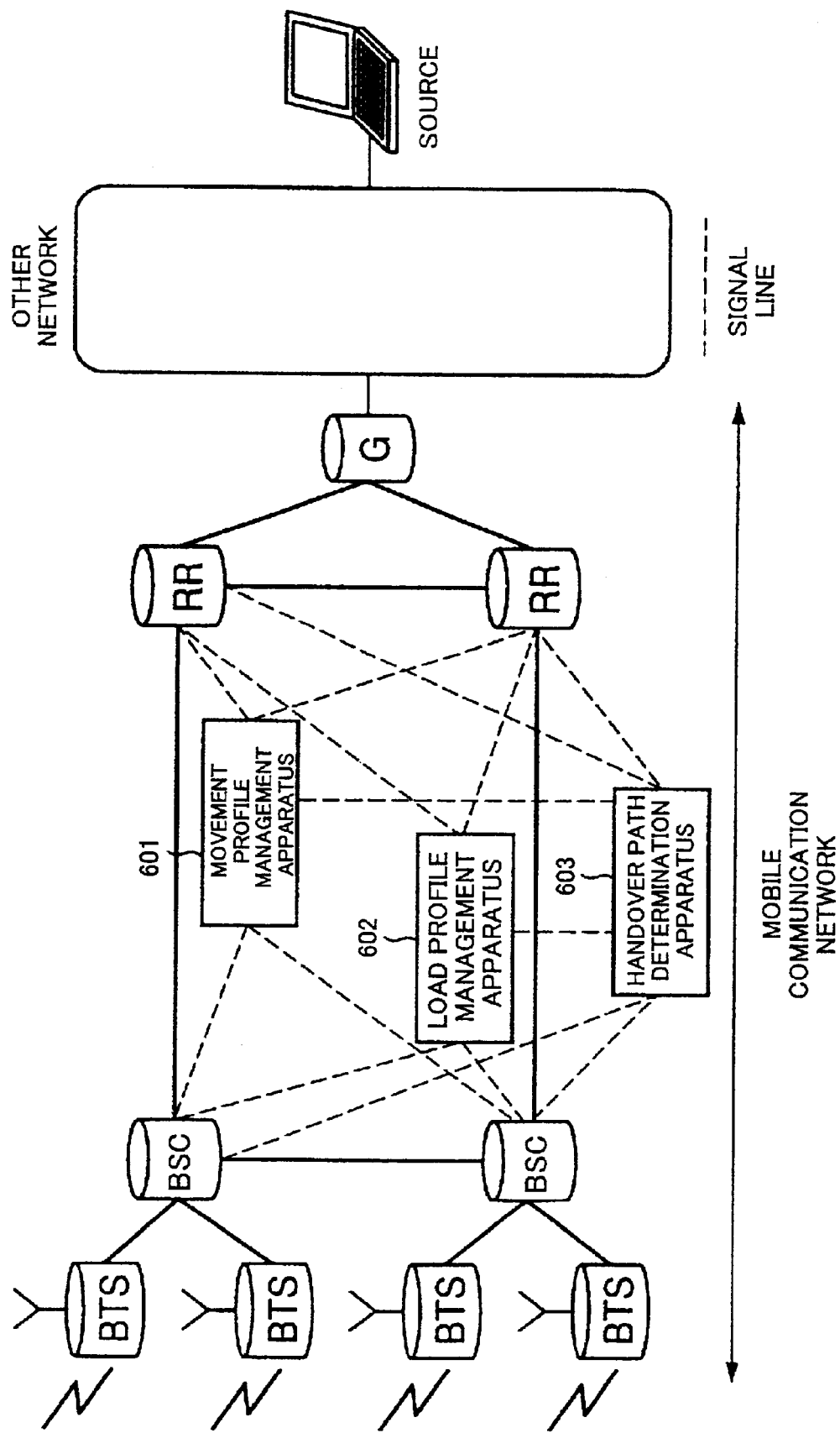
FIG. 6 is a schematic showing the mobile communication system according to one embodiment of the present invention.

The mobile communication system according to the embodiment of the present invention is outlined with reference to FIG. 6. FIG. 6 is a schematic showing this mobile communication system.

In FIG. 6, a movement profile management apparatus 601 holds and controls movement characteristics of each user (or each mobile station). The movement characteristic may be a movement velocity of the mobile station. A load profile management apparatus 602 keeps track of the load on each node by, for example, monitoring data quantities (or data lengths) queued on each node in the network, and holds and controls each load status. A handover path determination apparatus 603 determines the handover method to be used and the route for the handover path when the mobile station requests to perform the handover process, and controls the whole system based on the determined handover method and route.

Figure 7:
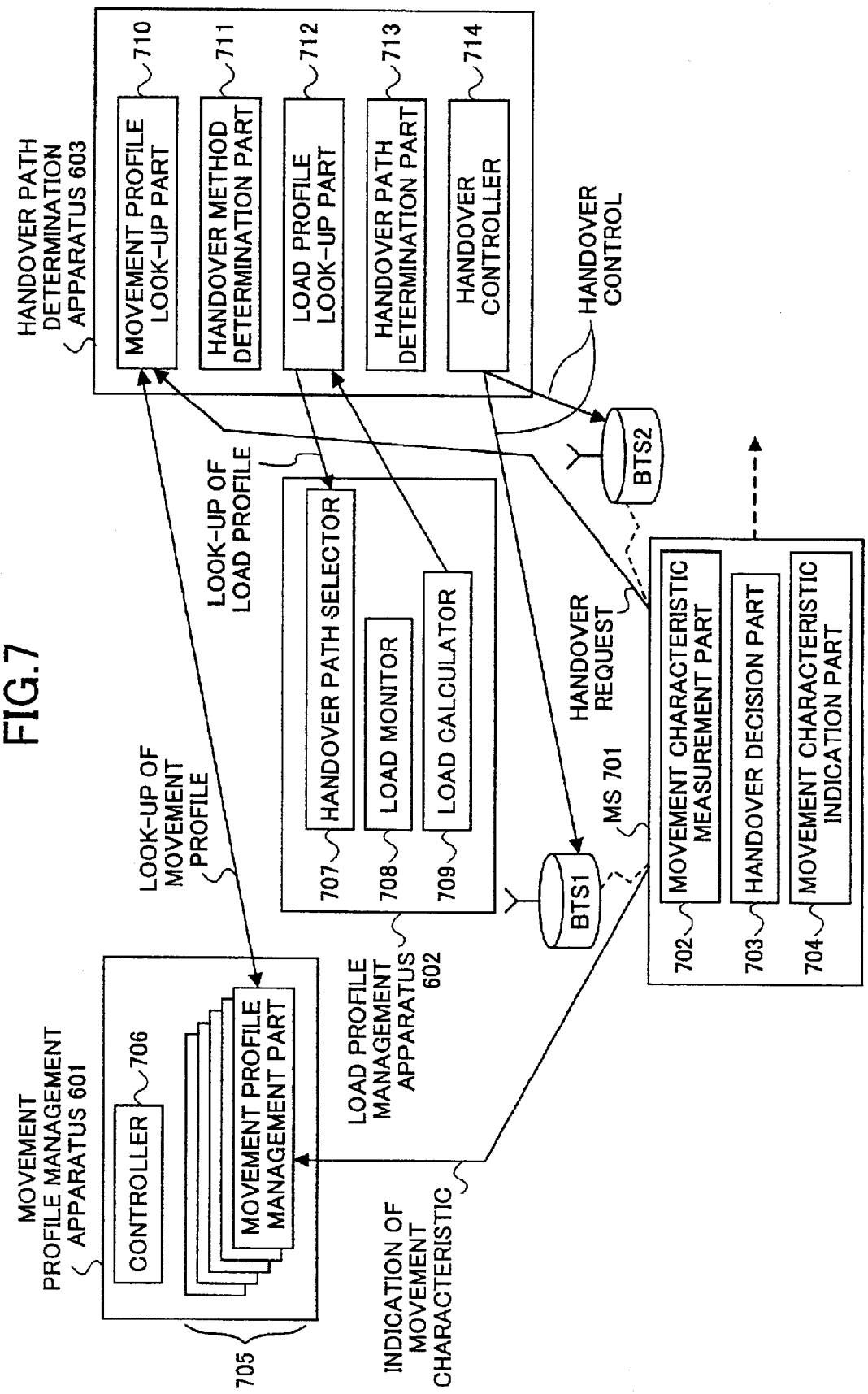
FIG. 7 is a schematic showing each configuration of a movement profile management apparatus, a load profile management apparatus, and a handover path determination apparatus according to the embodiment of the present invention.

Detailed configurations of the above three apparatuses 601–603 shown in FIG. 6 are described with reference to FIG. 7. FIG. 7 is a schematic showing the configurations of the movement profile management apparatus 601, the load profile management apparatus 602, and the handover path determination apparatus 603 of this embodiment.

As shown in FIG. 7, a mobile station 701 includes a movement characteristic measurement part 702 for measuring the movement characteristics of the mobile station such as a movement velocity, a handover decision part 703 for detecting the mobile station coming into an overlapping zone, and a movement characteristic indication part 704 for indicating the movement characteristic measured by the movement characteristic measurement part 702 to the movement profile management apparatus 601.

Also, the movement profile management apparatus 601 includes movement profile management parts 705 provided for each mobile station, and controller 706 for controlling the movement profile management parts 705.

Further, the load profile management apparatus 602 includes a handover path selector 707 for picking up all possible handover path candidates that can be employed by the handover method determined to be used, a load monitor 708 for monitoring the load status on each node in the network, a load calculator 709 for calculating the load on the network due to each of the handover path candidates picked up by the handover path selector 707.

Furthermore, the handover path determination apparatus 603 includes a movement profile look-up part 710 for making reference to the movement profile management part 705 of the mobile station requesting the handover process, a handover method determination part 711 for estimating the overlapping zone residence time of the handover-requesting mobile station on the basis of the movement characteristic of that mobile station and a pre-stored cell configuration, and for determining a handover method to be used, a load profile look-up part 712 for indicating the handover method determined by the handover method determination part 711 to the load profile apparatus 602, and for obtaining the loads that will occur on the network when each of the possible handover path candidates employed by the handover method is employed from the load profile apparatus 602, a handover path determination part 713 for selecting a final handover path having the lowest load among the possible handover paths that can be employed by the determined handover method, and a handover controller 714 for controlling each node such that the handover-requesting mobile station can make a connection using the final handover path.

Figure 8:
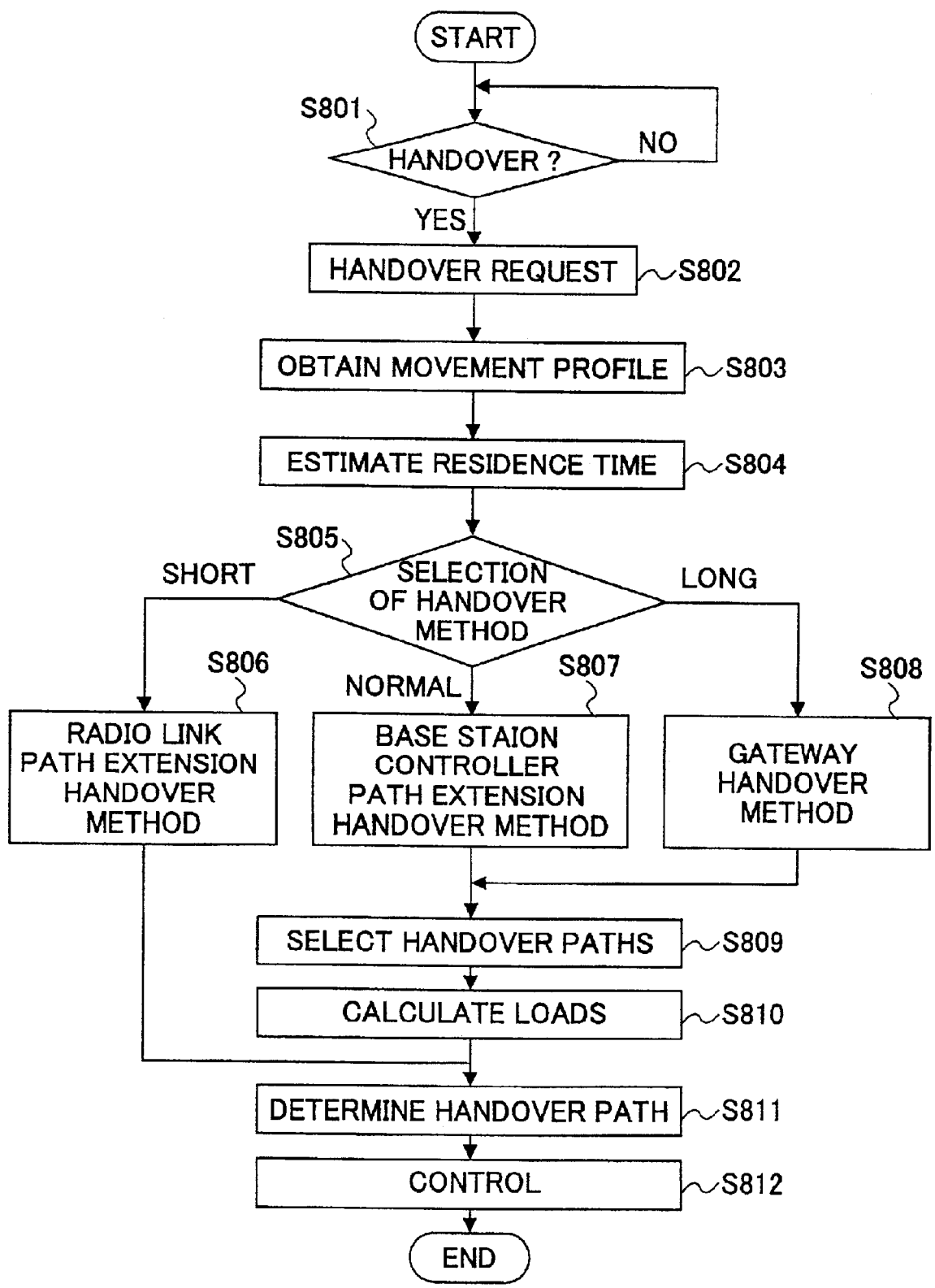
FIG. 8 is a flowchart showing a process of the handover control method according to the embodiment of the present invention.

A handover control process according to this embodiment is now described with reference to FIG. 8. FIG. 8 is a flowchart showing a process of the handover control method according to this embodiment.

The movement characteristic measurement part 702 of the mobile station measures the movement characteristics such as the movement velocity of the mobile station. The load monitor 708 monitors the load status on each node in the network.

The handover decision part 703 of the mobile station monitors whether the mobile station comes into an overlapping zone (S801).

If it is detected that the mobile station comes into an overlapping zone ("YES" at S801), a handover request is transmitted to the handover path determination apparatus 603 (S802), and the movement characteristic indication part 704 makes a report of the latest result of measured movement characteristics to the movement profile management apparatus 601. The reported movement characteristic is stored in the movement profile management part 705 for that mobile station. In this context, the latest result may be measured during a predetermined period immediately preceding the time when it is detected that the mobile station comes into the overlapping zone. This predetermined period may be set at any length. However it should be noted that too-old history is not useful because it is considered that such history does not reflect exactly the current movement status.

When the handover path determination apparatus 603 receives the handover request, the profile look-up part 710 accesses to the movement profile management apparatus 601, and obtains the movement profile of the handover-requesting mobile station from the movement profile management part 705 that holds and controls the movement profile of that mobile station (S803).

The handover method determination part 711 estimates an overlapping zone residence time of the handover-requesting mobile station on the basis of the movement profile (for example, a history of the movement velocity) of that mobile station from the movement profile look-up part 710 and the pre-stored cell configuration (S804), and selects the handover method to be used based on the estimate (S805).

The above selection process may use a threshold value. For example, in the case that the estimated residence time is relatively long, the gateway handover method of which load on the network is lowest will be selected (S808), while in the case that the estimated residence time is very short, the radio link path extension handover method that requires the shortest time to perform the handover process will be selected (S806), and otherwise the base station controller path extension handover method will be selected (S807).

When the radio link path extension handover method is employed at S806, the route of the handover path over the wired section in the network is uniquely determined (S811), and the control process proceeds to S812. On the other hand, when the base station controller path extension handover method is employed at S807 or the gateway handover method is employed at S808, the process proceeds to S809 in order to minimize the load on the network.

Figure 9:
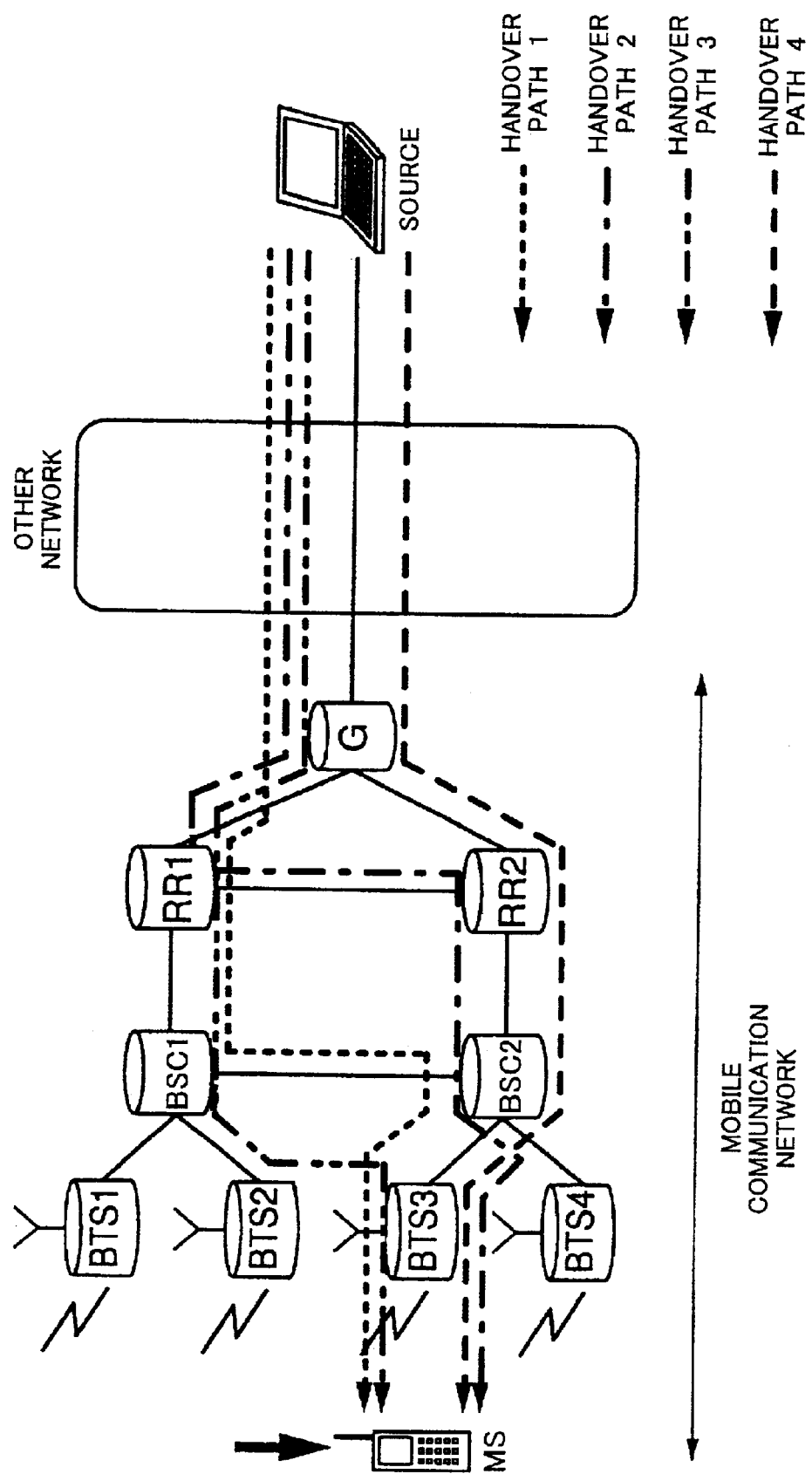
FIG. 9 is a schematic showing an example of handover path candidates selected by the handover path selector according to the embodiment of the present invention when the gateway handover method is employed.

At S809, the load profile look-up part 712 indicates the determined handover method to the handover path selector 707 in the load profile management apparatus 602. Upon receiving the handover method, the handover path selector 707 lists all possible routes of the handover path that can be employed by the determined handover method (S809). Among the handover path candidates picked up by the handover path selector 707, an example of a case in which the gateway handover method is employed is shown in FIG. 9. Although only four handover path candidates are shown here for convenience of representation, other routes can be employed in the case of FIG. 9, and in practice more routes can be employed because there will be more nodes in an actual network.

The load calculator 709 computes how the load status on each node in the network will change by employing each route of the handover path candidates picked up by the handover path selector 707 with reference to the monitoring result from the load monitoring part 708, and provides the computation result to the load profile look-up part 712 (S810).

The handover path determination part 713 then determines a single handover path on the basis of the computation result obtained by the load profile look-up part 712 such that the load over the whole system will be minimized without load congestion at a certain node by employing this handover path (S811).

The handover controller 714 then controls the base stations and the nodes in the network such that the handover-requesting mobile station can make a connection using the handover path determined by the handover path determination part 713 (S812).

Thus, according to this embodiment, the handover method that requires the shortest time to perform the handover process is employed for the mobile station of which overlapping zone residence time is short in order to avoid a line disconnection, while the handover method that requires relatively longer time to perform the handover process but improves the efficiency of use of the network resources is employed for the mobile station of which overlapping zone residence time is relatively long. Consequently the efficiency of use of the network resources is improved on the whole.

Although in the above embodiment the overlapping zone residence time of the mobile station is estimated using the movement velocity and the cell configuration, the present invention is not limited to that aspect and can use an overlapping zone residence time estimated in a different manner.

For example, an overlapping zone residence time can be estimated by measuring an attenuation factor of electric field intensity from the previous base station before the handover process to the mobile station to estimate how soon the handover-performing mobile station will no longer be able to receive electric waves from that base station on the basis of this attenuation factor.

Further, although in the above embodiment an aspect is described that the components of the system are distributed in the three apparatuses, the present invention is not limited to that aspect. This system can be located anywhere on the network. Each of the components can be located on any of more than one apparatus.

As described above, according to the present invention, the efficiency of use of the network resources is improved.

The present invention is not limited to the specifically disclosed embodiments, and variations and modifications may be made without departing from the scope of the invention.

What is claimed is:

1. A handover control method for use in a mobile communication system, the method comprising the steps of:
   changing a handover method according to an overlapping zone residence time of a mobile station;
   the step of changing a handover method comprising the sub-steps of,
   ranking the handover methods for the mobile station including a gateway handover method, a base station controller path extension handover method, and a radio link path extension handover method in association with how long the overlapping zone residence time of the mobile station is; and
   selecting one of the handover methods for the mobile station among the three methods, which method corresponds to the overlapping zone residence time of the mobile station.

2. The handover control method as claimed in claim 1, the method further comprising the step of:
   selecting a handover path of which load on the system is minimum among the handover paths that can be employed by the selected handover method, when either the gateway handover method or the base station controller path extension handover method is selected for use.

3. The handover control method as claimed in claim 2, wherein:
   the overlapping zone residence time is estimated on the basis of a velocity of the mobile station and a configuration of cells.

4. The handover control method as claimed in claim 2, wherein:
   the overlapping zone residence time is estimated on the basis of an attenuation factor of electric field intensity from a previous base station before a handover process to a handover-performing mobile station.

5. A mobile communication system comprising base stations that can communicate with mobile stations, a communication network including a plurality of nodes, and a handover control apparatus, wherein,
   the mobile station comprises:
   a part for indicating a movement characteristic of the mobile station and a handover request to the handover control apparatus,
   the handover control apparatus comprises:
   a part for holding movement characteristics of the mobile stations;
   a part for determining a handover method on the basis of the movement characteristic of a mobile station upon receiving a handover request from the mobile station;
   a part for determining a handover path of which load on the system is minimum among the handover paths that can be employed by the determined handover method; and
   a part for controlling the nodes and the base stations such that the mobile station are connected with the base station and the nodes using the determined handover path.

6. The mobile communication system as claimed in claim 5, wherein,
   the movement characteristic is a velocity of the mobile station,
   the part for determining a handover method comprises:
   a part for estimating an overlapping zone residence time of the mobile station on the basis of the velocity of the mobile station and a configuration of cells; and
   a determination part for determining a handover method on the basis of the overlapping zone residence time of the mobile station,
   the determination part for determining a handover method selects one handover method used for the mobile station among three handover methods, which method corresponds to the overlapping zone residence time of the mobile station, and
   the three handover methods include a gateway handover method, a base station controller path extension handover method, and a radio link path extension handover method, and are ranked in association with how long the overlapping zone residence time of the mobile station is.

7. The mobile communication system as claimed in claim 5, wherein,
   the movement characteristic of the mobile station is an attenuation factor of electric field intensity from a previous base station before a handover process to a handover-performing mobile station,
   the part for determining a handover method comprises:
   a part for estimating an overlapping zone residence time of the mobile station on the basis of the attenuation factor; and
   a determination part for determining a handover method on the basis of the overlapping zone residence time of the mobile station,
   the determination part for determining a handover method selects one handover method used for the mobile station among three handover methods, which method corresponds to the overlapping zone residence time of the mobile station, and
   the three handover methods includes a gateway handover method, a base station controller path extension handover method, and a radio link path extension handover method, and are ranked in association with how long the overlapping zone residence time of the mobile station is.

8. A handover control apparatus provided in a communication network including a plurality of nodes and base stations that can communicate with mobile stations, the apparatus comprising:
- a part for holding movement characteristics reported from the mobile stations;
- a part for determining a handover method on the basis of the movement characteristic of a mobile station upon receiving a handover request from the mobile station;
- a part for determining a handover path of which load on the network is minimum among the handover paths that can be employed by the determined handover method; and
- a part for controlling the nodes and the base stations such that the mobile station is connected with the base station and the nodes using the determined handover path.

9. The handover control apparatus as claimed in claim 8, wherein,
- the movement characteristic is a velocity of the mobile station,
- the part for determining a handover method comprises:
- a part for estimating an overlapping zone residence time of the mobile station on the basis of the velocity of the mobile station and a configuration of cells; and
- a determination part for determining a handover method on the basis of the overlapping zone residence time of the mobile station,
- the determination part for determining a handover method selects one handover method used for the mobile station among three handover methods, which method corresponds to the overlapping zone residence time of the mobile station, and
- the three handover methods include a gateway handover method, a base station controller path extension handover method, and a radio link path extension handover method, and are ranked in association with how long the overlapping zone residence time of the mobile station is.

10. The handover control apparatus as claimed in claim 8, wherein,
- the movement characteristic of the mobile station is an attenuation factor of electric field intensity from a previous base station before a handover process to a handover-performing mobile station,
- the part for determining a handover method comprises:
- a part for estimating an overlapping zone residence time of the mobile station on the basis of the attenuation factor; and
- a determination part for determining a handover method on the basis of the overlapping zone residence time of the mobile station,
- the determination part for determining a handover method selects one handover method used for the mobile station among three handover methods, which method corresponds to the overlapping zone residence time of the mobile station, and
- the three handover methods include a gateway handover method, a base station controller path extension handover method, and a radio link path extension handover method, and are ranked in association with how long the overlapping zone residence time of the mobile station is.

* * * * *